United States Patent [19]
Ruge et al.

[11] 3,752,952
[45] Aug. 14, 1973

[54] PROCESS FOR PRECISION SETTING OF THE ELECTRON BEAM IN ELECTRON BEAM WELDING

[75] Inventors: Jurgen Ruge; Heiner Eggers, both of Braunschweig, Germany

[73] Assignee: Steigerwald Strahltechnik GmbH, Munchen, Germany

[22] Filed: Mar. 23, 1971

[21] Appl. No.: 127,331

[30] Foreign Application Priority Data
Mar. 24, 1970 Germany.................. P 20 13 950.8

[52] U.S. Cl...................... 219/121 EM, 219/121 EB
[51] Int. Cl............................................ B23k 15/00
[58] Field of Search...................... 219/121, 121 EB, 219/121 EM; 250/49.5 TE, 49.5 R

[56] References Cited
UNITED STATES PATENTS
3,291,959    12/1966    Schleich et al. ............. 219/121 EM
3,329,813    7/1967    Hashimoto.......................... 250/49.5

*Primary Examiner*—J. V. Truhe
*Assistant Examiner*—Gale R. Peterson
*Attorney*—Sandoe, Hopgood & Calimafde

[57] ABSTRACT

A process for the precise setting of the electron beam in electron beam welding by the capturing of the electrons scattered back from the moving workpiece or workpieces and/or through sensing of the secondary electrons in which the setting is performed by determining the directional distribution of the leaked back electrons and/or secondary electrons as a function of the geometry of the weld cavity produced. Since the angular distribution of the electrons leaked back by the weld cavity and/or the secondary electrons emitted therefrom is asymmetric in the half-space above the welding point, this distribution permits the geometry of the weld cavity to be deduced respectively the corresponding setting of the electron beam to be determined precisely.

4 Claims, 9 Drawing Figures

PATENTED AUG 14 1973 3,752,952

INVENTORS
JURGEN RUGE
HEINER EGGERS
BY
Kenyon & Kenyon Reilly Carr & Chapin
ATTORNEYS

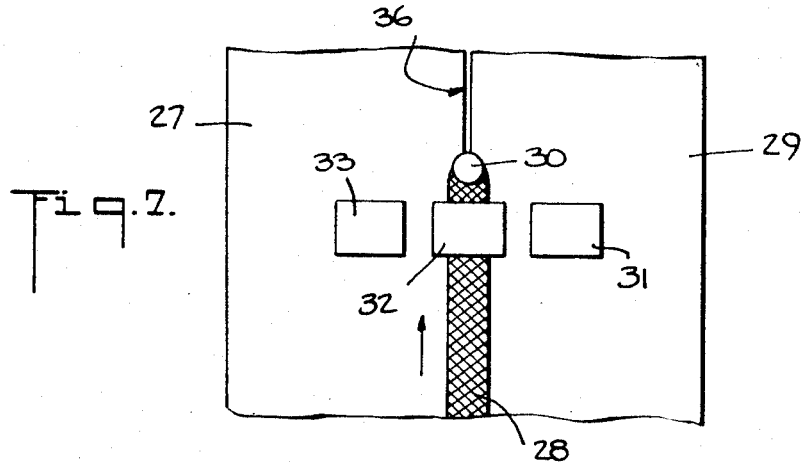
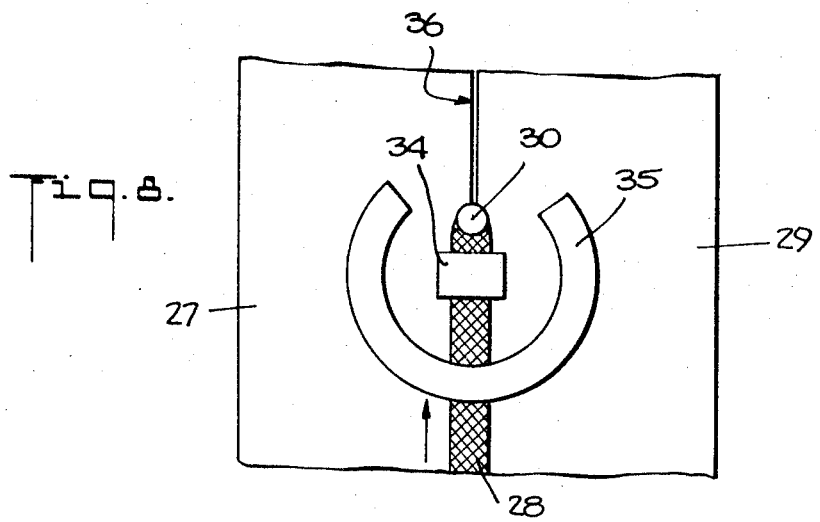
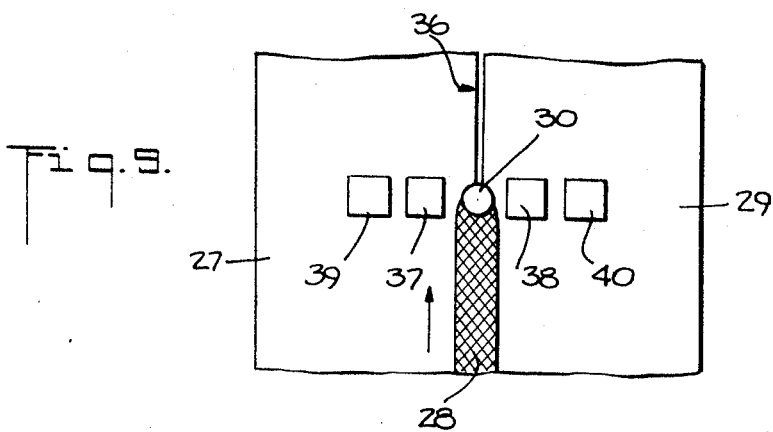

PROCESS FOR PRECISION SETTING OF THE ELECTRON BEAM IN ELECTRON BEAM WELDING

The invention relates to a process for the precision setting of the electron beam in electron beam welding, in particular for purposes of focusing and adjusting of the electron beam.

According to a process known in the art, the focusing is performed on a piece of tungsten arranged at the level of the workpiece surface to be worked, which glows up upon optimum focus elevation. The electron beam must then be cut off and the entire apparatus be moved over the workpiece surface to be worked, and then be reactuated.

This known process is extraordinarily cumbersome. Besides, due to the need for the cutting off of the electron beam and the displacement of the apparatus, there is a risk that the values that have been determined will be modified again.

It is therefore the object of the instant invention to obviate the drawbacks of the above-described known process. In particular, it has as its object to develop a process permitting a rapid, reproducible and reliable setting of the electron beam, especially a reliable focusing and adjusting.

On the basis of a process for the precise setting of the electron beam in electron beam welding by the capturing of the electrons and/or secondary electrons scattered back from the moving workpiece or workpieces, the above-described object is solved in accordance with the invention in that the setting is performed by determining the direction distribution of the leaked back electrons and/or secondary electrons, as a function of the geometry of the generated welding seams.

Further particulars of the invention are explained in greater detail by the annexed drawings where FIGS. 1 to 4 respectively illustrate a cross-section of a welding seam produced in the contact plane zone of two workpieces with varied focus settings of the electron beam;

Figure 1:
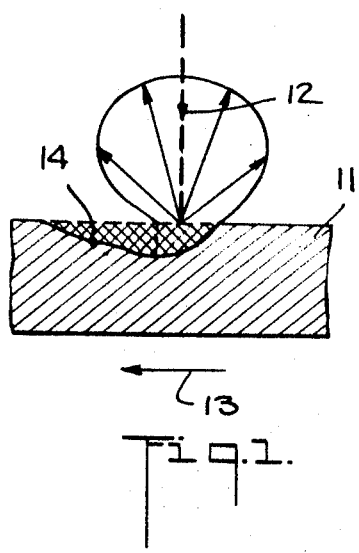
Figure 2:
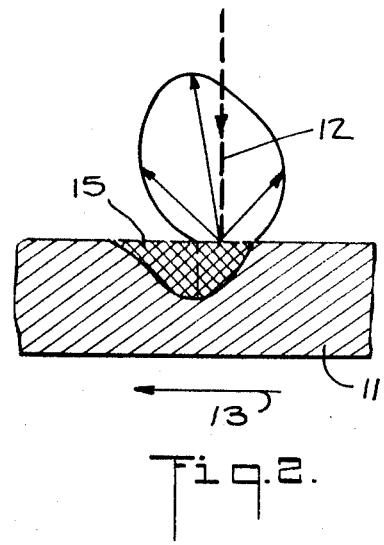
Figure 3:
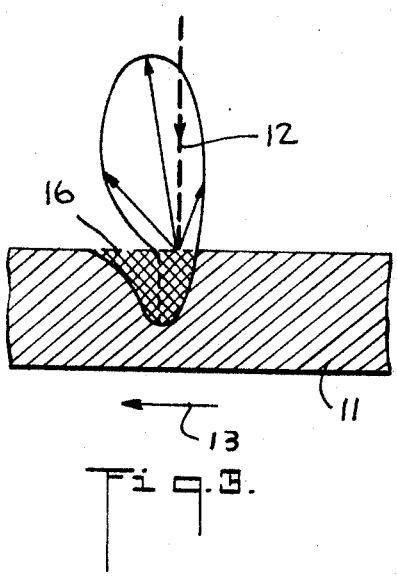
Figure 4:
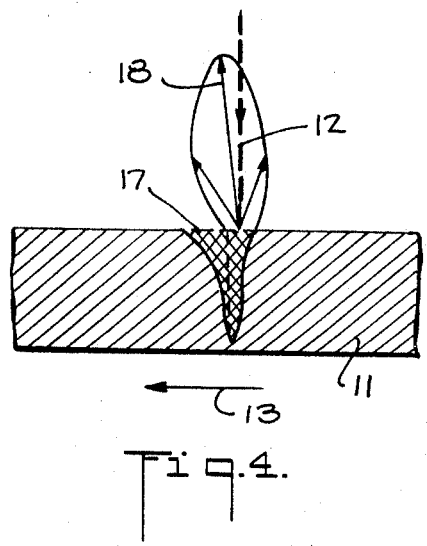

FIGS. 7 to 9, respectively, show a top view of two workpieces to be welded together with measurement points arranged above the welding seam to be formed for determining the intensity of the leaked back electrons and/or secondary electrons.

In FIGS. 1 to 4, the reference 11 designates one of two workpieces to be joined by means of electron beam seam welding; the direction of the electron beam striking the workpieces is referred to by 12, and the movement of the workpieces with respect to the electron beam is designated by the reference 13. From FIGS. 1 to 4, one can see that the respective welding seam 14, 15, 16, and 17 produced by the electron beam is unsymmetrically shaped while the depth of such a welding seam is dependent on the respective setting of the electron beam focus elevation above the welding seam.

Now in view of the fact that the angular distribution of the electrons and/or the secondary electrons emitted from there, leaked back by the workpieces or by the welding seam, is also produced in a correspondingly unsymmetrical pattern in the half-space above the welding point, this angular distribution makes it possible to infer the geometric configuration [lit.: "geometry"] of the welding seam, respectively to determine precisely the corresponding setting of the electron beam.

The FIGS. 1 to 4 illustrate also the unsymmetrical angular distribution of the leaked back electrons and secondary electrons depending on the respective geometry of the welding seams 14, 15, 16, and 17. As can readily be seen by a comparison of the angular distributions according to the FIGS. 1 to 4, the angular distribution is at its narrowest with optimum welding depth, and the maximum of the angular distribution is formed by a direction 18 (FIG. 4) situated in immediate proximity of the direction 12 of the electron beam.

The process according to the invention thus permits a determining, respectively, of a precision setting of the optimum focus elevation of the electron beam through determining of the directional distribution, depending on the geometry of the welding seams, of the scattered back electrons and/or secondary electrons.

Moreover, the process according to the invention makes possible an accurate setting of the required direction of the electron beam by means of determining the directional pattern of the leaked back electrons and/or secondary electrons, depending on the geometry of the generated welding seams.

With the process according to the invention the intensity of the electrons leaked back from the displaced workpieces and/or the secondary electrons emanating from the welding point is determined at least at two measurement points spaced apart from one another, and one uses a corresponding signal as an input signal for an electronic control device continuously providing for the setting of the electron beam under optimum conditions with regard to the production of a perfect welding seam (optimum focus height respectively optimum directional setting).

Figure 5:
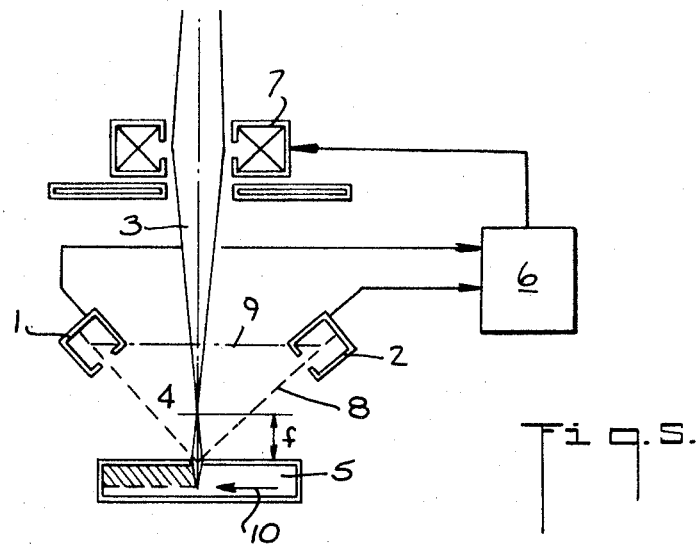
FIG. 5 is an exemplified embodiment of an arrangement according to the invention for the focusing of the electron beam.

FIG. 5 represents an exemplified arrangement for the performing of the process according to the invention. Accordingly, there are provided two electron collectors 1, 2 arranged symmetrically with respect to a welding beam 3, which measure the intensity of an electron current 8 current 8 leaked back from a displaced workpiece 5. The differential current between these two measurement points 1 and 2 serves as an input signal for a control device 6, which may be a regulator, an indicator or the like and which controls the current of an electromagnetic lens 7 in such a way that the optimum focusing height f required for producing perfect welding seams is maintained at all times. The focus is referred to by the numeral 4.

In the case of proper focus height, the welding beam 3 produces a welding seam on the surface to be worked on the workpiece 5, which, due to the movement of the workpiece 5 results in an asymmetrical reflection of the electron current 8. The differential current resulting therefrom and that is to be measured by the measurement points 1 and 2 is used for the actuating of the control device 6 which produces in turn an adjustment of the focus height, preferably by changing the current of the electromagnetic lens 7 or else however also through a change in the acceleration voltage of the welding beam 3.

The moment the focus height has attained its optimum value, a maximum differential current is measured between the two electron sensors 1 and 2, and after which the differential current 3 is reduced with further increasing, decreasing focus height. Preferably, the connecting line 9 imagined between the two electron sensors 1 and 2 runs parallel to the displacement vector 10 of the workpiece 5.

Other suitable arrangements of measurement points to determine the intensity of the leaked back electrons and/or secondary electrons are illustrated in FIGS. 6 to 9.

Figure 6:
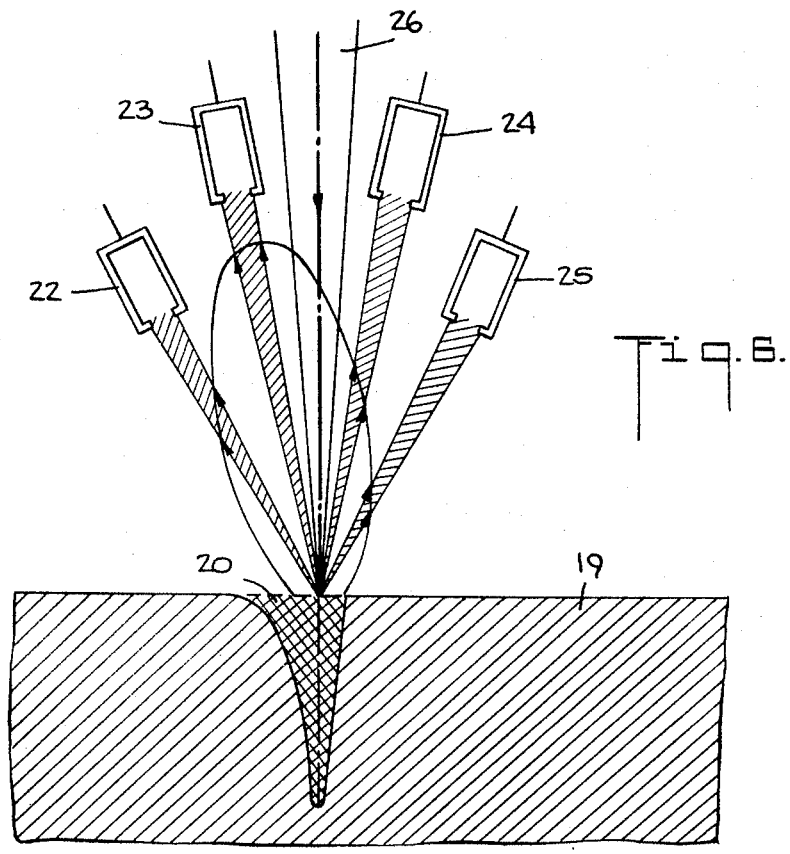
FIG. 6 is an arrangement of a plurality of measuring points above a welding seam to determine the intensity of the leaked back electrons and/or secondary electrons.

According to FIG. 6, four electron sensors 22, 23, 24, and 25 are arranged above the workpiece 19 in a line parallel to the welding seam. The sensor 23 is situated close to the electron beam 26 and in the direction of the maximum of the angular distribution of the leaked back electrons and/or secondary electrons. The sensor 22 is situated parallel to the direction 21 of the workpiece movement behind the sensor 23. The optimum welding depth is at a maximum of the difference of the sensor currents $I_{23} - I_{22}$.

In order to take into account the reduction in overall current of the electrons reflected by the welding capillary 20 upon optimum welding depth, sensors 24 and 25 are arranged on the side of the electron beam 26 opposite the direction of movement of the workpiece 21. The difference of the sensor currents $I_{24} - I_{25}$ is likewise being measured. The optimum welding depth lies then at a maximum of the ratio V of the two current differences:

$$I_{23} - I_{22}/I_{24} - I_{25} = V_{max}$$

The FIGS. 7 to 9, respectively, show two workpieces 27 and 29 to be butt-welded at their mutual contact area 36. The electron beam entering perpendicular to the drawing plane into the contact area 36 and forming a momentary welding point 30 moves with respect to the workpieces 27 and 29 in the direction of the arrow, leaving behind a connected area 28 (welding seam).

According to FIG. 7 there are now juxtapositioned three sensors 31, 32 and 33 in a direction perpendicular to the welding seam 28, with the sensor 32 being situated close to the electron beam and in the direction of the maximum of the angular distribution of the leaked back electrons. The sensors 31 and 33 provided on either side of the welding seam 28 are electrically connected in parallel. This takes into account the circumstance that, in certain welding proceses, the angular distribution of the reflected electrons perpendicular to the welding seam 28 is smaller than in the direction of the welding seam.

In the case of very deep and narrow welding seams, like those produced for instance during electron beam impulse welding, an arrangement of the sensors 34 and 35 according to FIG. 8 may be appropriate. By means of this arrangement the sensitivity for the measurement of the angular distribution of the leaked back electrons and/or secondary electrons can be even increased.

An arrangement of four sensors 37, 38, 39 and 40 according to FIG. 9 in a direction running vertical to the welding seam 28 and in one line with the momentary welding point 30 makes possible in a very advantageous manner a control of the position and the direction of the welding seams at the momentary welding point 30. In the process, the main direction of the angular distribution of the leaked back electrons and/or secondary electrons is determined by a comparison of the distribution gradients at both sides of the welding seam and the measuring of the respective current differences $$I_{39} - I_{37} \text{ and}$$

$$I_{40} - I_{38}.$$

The position and direction of the welding seams are at their optimum when $$I_{39} - I_{37} = I_{40} - I_{38}.$$

What is claimed is:

1. In combination in welding apparatus, a source of an electron welding beam, and means for automatically adjusting the focus of said beam relative to the surface of workpiece means, said automated beam focusing means comprising plural spaced electron detectors for recovering electrons reflected and emitted at a weld cavity in the workpiece means, in associated, differing spacial directions, responsive to the impingement of said electron beam thereon, said electron reflected and emitted at said weld cavity exhibiting an asymmetrical electron angular distribution pattern, means for focusing said electron beam relative to the workpiece means, difference determining means operably connected to said electron detectors for providing a difference signal dependent upon the asymmetry of the angular distribution pattern of electrons reflected and emitted by the weld cavity as sent by said electron detectors, and means responsive to said difference signal for controlling said electron beam focusing means.

2. A combination as in claim 1 further comprising means for traversing said electron beam relative to the workpiece means in a given direction, and wherein said electron detectors are spaced in a direction parallel to said given direction.

3. The method of automatically maintaining the focus of an electron welding beam in a preferred relationship with respect to a weld seam formed in workpiece means, comprising the steps of directing said electron beam to said workpiece means via focusing means, measuring at discrete locations the spacial distribution pattern of electrons reflected and emitted at a weld cavity in said workpiece means responsive to said incident electron beam, measuring the asymmetry of the reflected and emitted electron angular distribution, and adjusting the focus of the electron beam relative to the workpiece means in accordance with the measured distribution asymmetry.

4. The method as in claim 3 further comprising the steps of moving the workpiece means relative to the beam, directing the electron beam orthogonal to the workpiece means, and detecting an asymmetry of the reflected and emitted spacial electron distribution oriented in the direction of workpiece motion.

* * * * *

UNITED STATES PATENT OFFICE
CERTIFICATE OF CORRECTION

Patent No. 3,752,952   Dated August 14, 1973

Inventor(s) Jurgen Ruge and Heiner Eggers

It is certified that error appears in the above-identified patent and that said Letters Patent are hereby corrected as shown below:

Column 4, line 34, cancel "sent" and insert --sensed--.

Signed and sealed this 23rd day of April 1974.

(SEAL)
Attest:

EDWARD M.FLETCHER,JR.  C. MARSHALL DANN
Attesting Officer  Commissioner of Patents